United States Patent
Han et al.

(10) Patent No.: US 12,148,946 B2
(45) Date of Patent: Nov. 19, 2024

(54) IMMERSION COOLING SYSTEM FOR BATTERY SYSTEMS OF ELECTRIC VEHICLES

(71) Applicant: GM GLOBAL TECHNOLOGY OPERATIONS LLC, Detroit, MI (US)

(72) Inventors: Taeyoung Han, Bloomfield Hills, MI (US); Ryan Patrick Hickey, Austin, TX (US); Matthew Swift, Detroit, MI (US); Chih-hung Yen, Bloomfield Hills, MI (US); William Yu Chen, Troy, MI (US); Goro Tamai, Bloomfield Hills, MI (US); Bahram Khalighi, Holladay, UT (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 17/743,605

(22) Filed: May 13, 2022

(65) Prior Publication Data
US 2023/0369708 A1    Nov. 16, 2023

(51) Int. Cl.
| | |
|---|---|
| *H01M 50/293* | (2021.01) |
| *H01M 10/613* | (2014.01) |
| *H01M 10/625* | (2014.01) |
| *H01M 10/647* | (2014.01) |
| *H01M 10/6567* | (2014.01) |

(Continued)

(52) U.S. Cl.
CPC ....... *H01M 50/293* (2021.01); *H01M 10/613* (2015.04); *H01M 10/625* (2015.04); *H01M 10/647* (2015.04); *H01M 10/6567* (2015.04); *H01M 10/658* (2015.04); *H01M 50/211* (2021.01); *H01M 50/317* (2021.01); *H01M 50/367* (2021.01); *H01M 2220/20* (2013.01)

(58) Field of Classification Search
CPC ............ H01M 50/293; H01M 50/211; H01M 50/317; H01M 50/367; H01M 10/613; H01M 10/625; H01M 10/647; H01M 10/6567; H01M 10/658
See application file for complete search history.

(56) References Cited

U.S. PATENT DOCUMENTS

| | | | |
|---|---|---|---|
| 2011/0159340 A1* | 6/2011 | Hu .................. | H01M 10/617 429/120 |
| 2014/0060020 A1* | 3/2014 | Peterson .............. | E02F 9/2296 60/420 |

(Continued)

FOREIGN PATENT DOCUMENTS

| | | | |
|---|---|---|---|
| DE | 102018218865 A1 | 5/2020 | |
| DE | 102020111372 A1 * | 10/2021 | ........... F16K 17/025 |

(Continued)

OTHER PUBLICATIONS

Office Action dated Jan. 24, 2024 from German Patent Office for German Patent No. 10 2022 127 481.0.

*Primary Examiner* — Christopher P Domone
*Assistant Examiner* — Jonathan William Estes

(57) ABSTRACT

An immersion cooling system for a battery system includes a battery enclosure and G battery cell groups arranged in the battery enclosure. Each of the G battery cell groups include C battery cells, where G and C are integers greater than one. A plurality of dividers are arranged between each of the G battery cell groups. A gas manifold removes vent gases from each of the G battery cell groups.

20 Claims, 7 Drawing Sheets

(51) Int. Cl.
*H01M 10/658* (2014.01)
*H01M 50/211* (2021.01)
*H01M 50/317* (2021.01)
*H01M 50/367* (2021.01)

(56) References Cited

U.S. PATENT DOCUMENTS

| | | | | |
|---|---|---|---|---|
| 2014/0342197 | A1* | 11/2014 | Andres | H01M 10/653 |
| | | | | 429/120 |
| 2016/0369711 | A1* | 12/2016 | Evans | F02D 19/025 |
| 2019/0123318 | A1* | 4/2019 | Fees | H01M 50/51 |
| 2020/0168962 | A1* | 5/2020 | Schlunke | B32B 3/08 |
| 2022/0037726 | A1* | 2/2022 | Choi | H01M 10/6556 |
| 2023/0198086 | A1* | 6/2023 | Raettich | F16K 17/025 |
| | | | | 429/54 |
| 2023/0369686 | A1* | 11/2023 | Puglia | H01M 50/264 |

FOREIGN PATENT DOCUMENTS

| | | | | |
|---|---|---|---|---|
| DE | 212021000404 U1 | | 7/2023 | |
| EP | 3480867 A1 | * | 5/2019 | ........ H01M 10/0418 |
| WO | WO-2021228782 A1 | * | 11/2021 | .......... H01M 10/613 |
| WO | WO-2022024284 A1 | * | 2/2022 | .......... H01M 10/613 |

\* cited by examiner

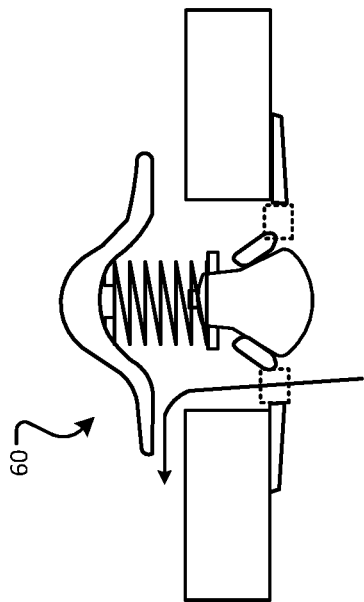
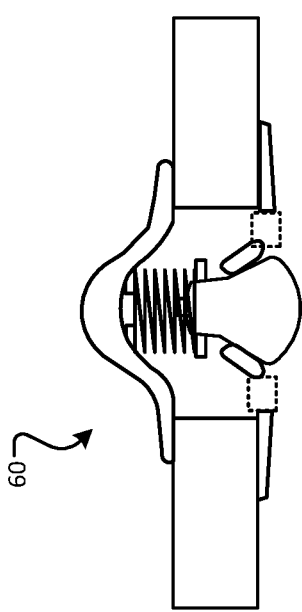
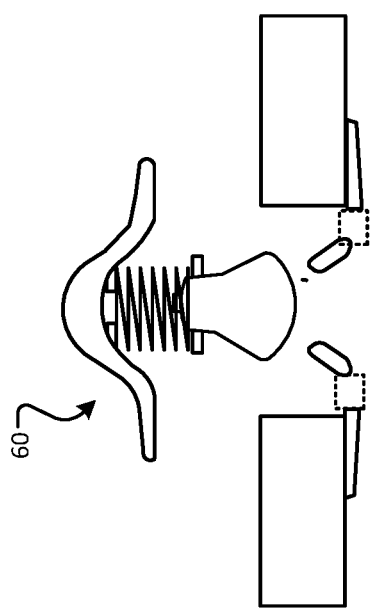
FIG. 3A
FIG. 3B
FIG. 3C

IMMERSION COOLING SYSTEM FOR BATTERY SYSTEMS OF ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems, and more particularly to immersion cooling systems for battery systems of electric vehicles.

Electric vehicles (EVs) such as battery electric vehicles (BEV), fuel cell vehicles or hybrid vehicles include a battery system with one or more battery cells, modules and/or packs. A power control system controls charging and/or discharging of the battery system during charging, regeneration and/or driving. During driving, one or more electric motors of the EV receive power from the battery system to provide propulsion for the vehicle and/or to return power to the battery system during regeneration and/or charging from a utility.

During operation, power is delivered by the battery system to the motor(s) and returned by the motor(s) to the battery system using one or more components such as power inverters, DC-DC converters and/or other components. The battery system is designed to deliver high power when requested, absorb high power quickly during charging from the utility and/or to absorb high power during regeneration.

The battery systems are expected to continue to increase in power density and operate at higher voltage levels. When operating under these conditions, significant heating of the battery cells, the battery modules, the battery pack, the power inverters, the DC-DC converters and/or other EV components can occur.

SUMMARY

An immersion cooling system for a battery system includes a battery enclosure and G battery cell groups arranged in the battery enclosure. Each of the G battery cell groups include C battery cells, where G and C are integers greater than one. A plurality of dividers are arranged between each of the G battery cell groups. A gas manifold removes vent gases from each of the G battery cell groups.

In other features, a first liquid manifold is configured to supply dielectric fluid to the battery enclosure to immerse the C battery cells of the G battery cell groups and a second liquid manifold is configured to receive dielectric fluid from the battery enclosure. Each of the plurality of dividers includes a first metal plate; an insulating member; and a second metal plate.

In other features, the first metal plate, the second metal plate and the insulating member extend along side surfaces of the C battery cells. Each of the plurality of dividers includes a first metal plate; a plurality of vertical insulating spacer members that are spaced horizontally apart; and a second metal plate. The plurality of vertical insulating spacer members comprises an insulating member. A plurality of metal plates is arranged between the C battery cells of each of the G battery cell groups. Each of the plurality of dividers includes a first metal plate; an insulating member; and a second metal plate having a "C"-shaped cross-section.

Each of the C battery cells in each of the G battery cell groups is a pouch-type battery cell.

In other features, G pressure relief valves are in fluid communication with the G battery cell groups, respectively, and the gas manifold.

A method for cooling a battery system includes arranging C battery cells in G battery cell groups, where G and C are integers greater than one; arranging the G battery cell groups in a battery enclosure, wherein each of the G battery cell groups include arranging a plurality of dividers between each of the G battery cell groups; and removing vent gases from the battery enclosure using a gas manifold in communication with each of the G battery cell groups.

In other features, the method include supplying dielectric fluid to the battery enclosure to immerse the C battery cells of the G battery cell groups. Each of the plurality of dividers includes: a first metal plate; an insulating member; and a second metal plate.

In other features, the first metal plate, the second metal plate and the insulating member extend along side surfaces of the C battery cells. Each of the plurality of dividers includes a first metal plate; a plurality of vertical spacer members that are spaced horizontally apart; and a second metal plate.

In other features, the plurality of vertical spacer members comprises an insulating material. The method includes arranging a plurality of metal plates between the C battery cells of each of the G battery cell groups. Each of the plurality of dividers includes a first metal plate; an insulating member; and a second metal plate having a "C"-shaped cross-section. Each of the C battery cells in each of the G battery cell groups is a pouch-type battery cell. The method includes arranging G pressure relief valves in fluid communication with the G battery cell groups, respectively, and the gas manifold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A to 3C are side cross-sectional views of a pressure relief valve;

In the drawings, reference numbers may be reused to identify similar and/or identical elements.

DETAILED DESCRIPTION

As described above, the power density and operating voltage of battery systems for EVs has increased significantly. Heating of EV components such as the battery cells, the battery module(s), the battery pack(s), the power inverter(s), the DC-DC converter(s) and/or other EV component(s) may occur during charging or operation.

Battery cells can fail due to several different reasons including decomposition, reaction between lithium (Li) and solvent at the anode, electrolyte decomposition, cathode decomposition, internal shorts due to separator breakdown, and rapid oxidation-reduction reactions between the cathode and the anode.

For example, DC fast charging (DCFC) systems may be used to charge the battery quickly, which may heat the EV components such as the battery cells. Cooling systems are used to maintain the battery components in a predetermined temperature range to ensure optimal performance and/or to prevent premature damage/wear due to excessive operating temperatures. For example, excessive heating of the battery cells may cause a condition called thermal runaway. As a battery cell begins to fail, hot gas/particles are emitted by the battery cell. The hot gas/particles from the failed battery cell can cause heat transfer to other adjacent battery cells. As the adjacent battery cells are heated, they too can fail and cause further failures or propagation.

An immersion cooling system according to the present disclosure prevents hot gas from heating neighboring battery cells by separating the battery cells into battery cell groups, supplying dielectric fluid to the battery cell groups, and managing vent gas generated by each of the battery cell groups to prevent the vent gas from that battery cell group from causing further battery cell failures due to overheating. In other words, the immersion cooling system prevents hot gas convection to neighboring battery cells to prevent thermal runaway propagation. As will be described further below, the immersion cooling system utilizes edge cooling or both edge and face cooling to prevent thermal runaway propagation to neighboring battery cells.

The immersion cooling system according to the present disclosure has improved cooling performance that enables DC fast charging while protecting battery life. The battery cooling system also provides effective cooling of a bus bar/connector/tab. The improved cooling tends to reduce the likelihood of an initial thermal runaway event. When one of the battery cells experiences a thermal runaway event, the immersion cooling system prevents thermal runaway propagation. In some examples, dielectric liquid has fire suppression characteristics that improve safety.

Figure 1:
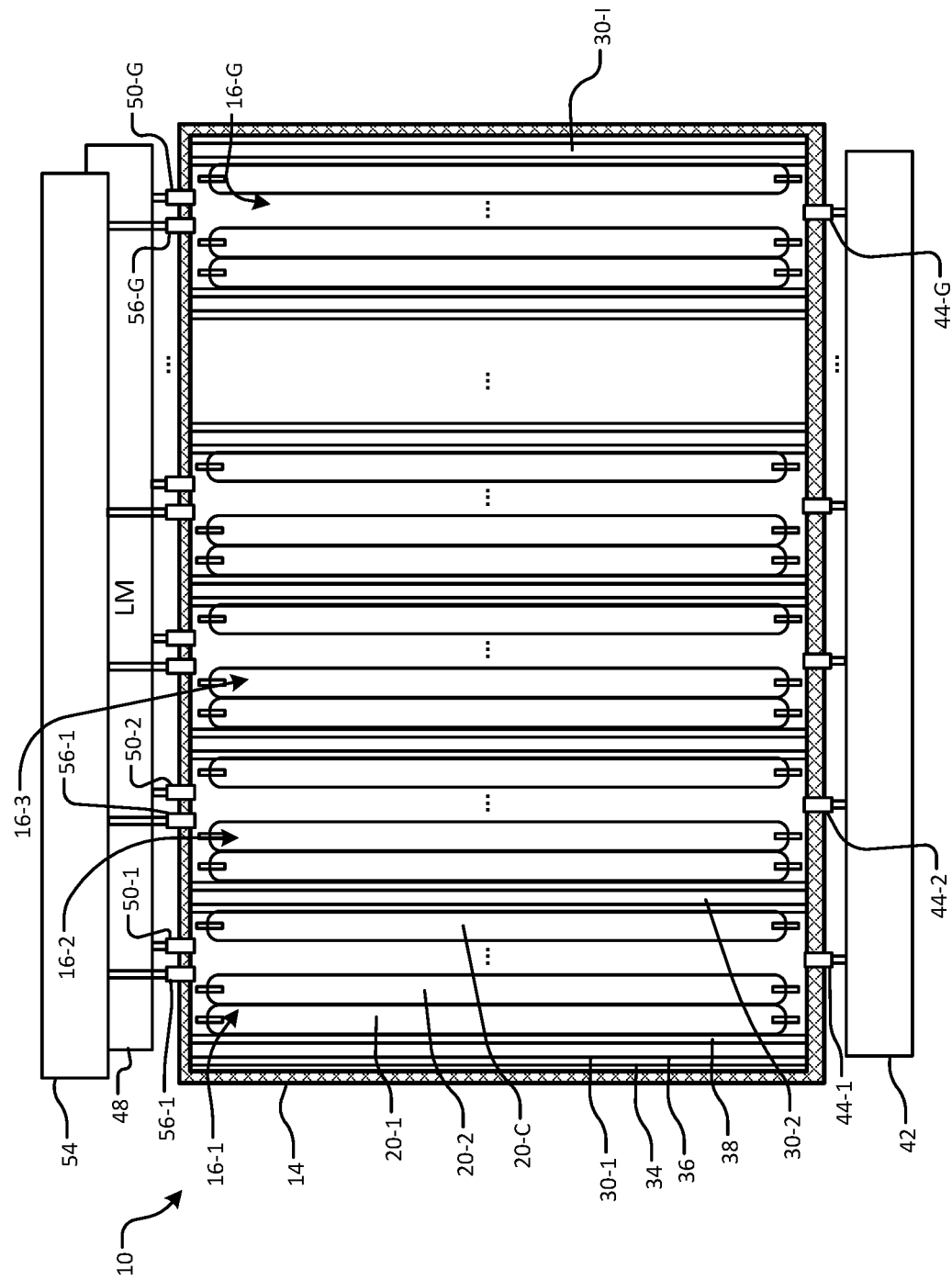
FIG. 1 is a plan view of an example of an immersion cooling system for a battery system according to the present disclosure.

Referring now to FIGS. 1 to 4A, an immersion cooling system 10 according to the present disclosure is shown. In FIG. 1, the immersion cooling system 10 includes a battery enclosure 14. A plurality of battery cell groups 16-1, 16-2, . . . , and 16-G (collectively or individually referred to as battery cell group(s) 16) are arranged in the battery enclosure 14, where G is an integer greater than one.

Each of the G battery cell groups 16 includes a plurality of battery cells 20-1, 20-2, . . . , and 20-C (collectively or individually referred to as battery cell(s) 20), wherein C is an integer greater than one. In some examples, the C battery cells 20 are pouch-type battery cells such as large format, pouch-type battery cells. The C battery cells 20 in each of the battery cell groups are compressed when installed in the battery enclosure 14.

The C battery cells 20 in each of the G battery cell groups 16 are arranged side-by-side between dividers 30-1, 30-2, . . . , 30-1 (collectively or individually referred to as divider(s) 30), where I is an integer greater than one. In some examples, each of the dividers 30 includes a metal plate 34, an insulating member 36, and a metal plate 38. In some examples, the insulating member 36 has a side area that is similar to a side area of the C battery cells 20. The C battery cells 20 of each of the G battery cell groups 16 are arranged between the dividers 30 in the battery enclosure 14.

A liquid manifold 42 supplies dielectric fluid to the battery enclosure 14 via conduits 44-1, 44-2, . . . , and 44-G (collectively and individually conduit(s) 44). In some examples, the dielectric fluid has fire suppression properties.

A liquid manifold 48 evacuates liquid dielectric from the battery enclosure 14 via conduits and/or connectors 50-1, 50-2, . . . , and 50-G (collectively and individually conduit(s) 50). A gas manifold 54 receives and removes vent gases from the battery enclosure 14 via conduits and/or connectors 56-1, 56-2, . . . , and 56-G (collectively and individually conduit(s) 56). In some examples, the dielectric fluid has fire suppression characteristics. In some examples, each of the G battery cell groups 16 includes inlets and outlets for liquid dielectric. In some examples, each of the G battery cell groups 16 includes an outlet for vent gas.

In FIGS. 2 and 3A to 3C, pressure relief valves 60 can be used between the G battery cell groups 16 and the inlet(s) of the gas manifold 54. In some examples, each of the G battery cell groups 16 includes one of the pressure relief valves 60. In FIG. 3A, one of the pressure relief valves 60 is shown in a closed position during normal operation. In FIG. 3B, one of the pressure relief valves 60 is shown in an open position due to pressure build up during a thermal runaway event. In FIG. 3C, one of the pressure relief valves 60 is shown in a popped position due to high pressure build up during a thermal runaway event.

For a large format pouch-type cells, thermal conductivity on the face surfaces is typically lower than the thermal conductivity on the edge surfaces. However, the face area is larger than the edge area. The effective thermal conductivity of the face ($K_F$) is equal to the area of the face ($A_F$) times the thermal conductivity of the face ($K_F A_F$). The effective thermal conductivity of the edge ($K_E$) is equal to the area of the edge ($A_E$) times the thermal conductivity of the edge ($K_F A_F$). The effective thermal conductivity along edges of the battery cells divided by the effective thermal conductivity of the face is ($K_E A_E / K_F A_F$). For large format pouch-type battery cells, the ratio of $K_E A_E / K_F A_F$ is greater than zero. In some examples, the ratio is approximately 2. In other words, significant cooling of the battery cells can be performed by cooling the edges without directly cooling the faces.

Figure 4A:
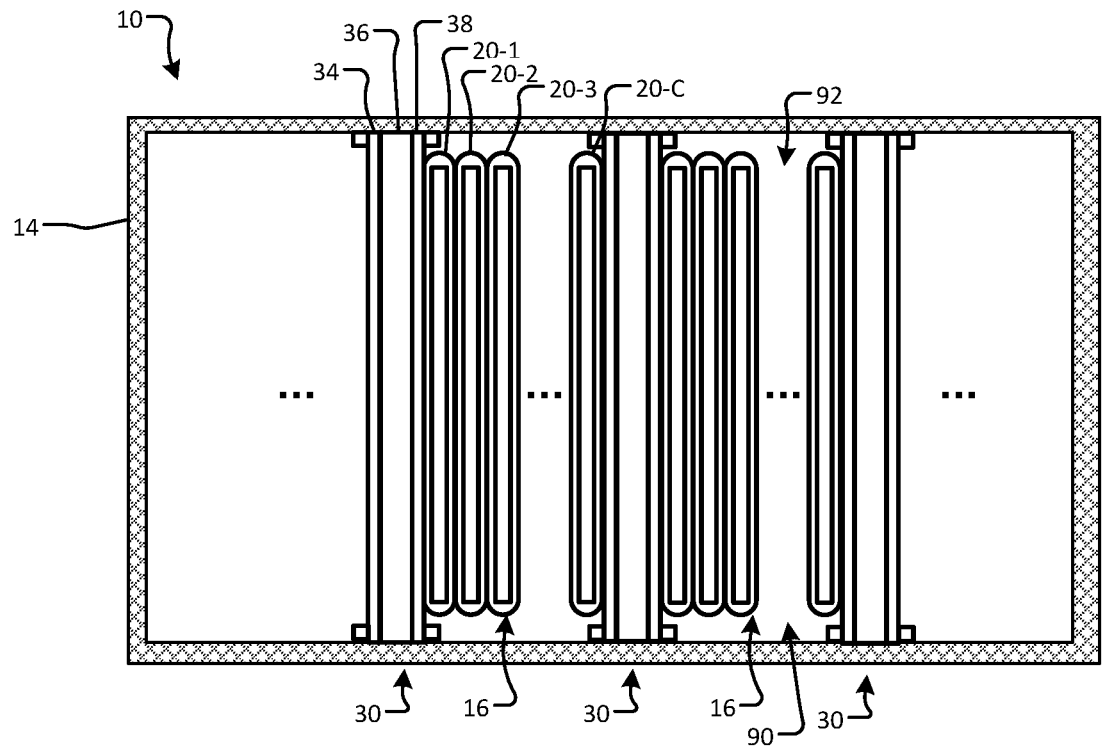
FIG. 4A is a side cross-sectional view of an example of an immersion cooling system with dividers including metal plates and an insulating member according to the present disclosure.

In FIG. 4A, dielectric fluid is supplied to the battery enclosure 14. The dielectric fluid is circulated by a pump (not shown) though the battery enclosure to cool edges of the C battery cells 20 in each of the G battery cell groups 16.

During operation, dielectric fluid 90 fills the battery enclosure to a level above the upper edges of the battery cells to immerse the battery cells. However, upper portions 92 of the battery enclosure may include a mixture of dielectric fluid and/or gas.

The dividers 30 provide thermal insulation between the G battery cell groups 16 and block the vent gases from flowing from one battery cell group to another. If one of the battery cells experiences elevated heating and emits vent gas, the vent gas is evacuated by the gas manifold and further heating of the G battery cells or the dielectric fluid is prevented. The dielectric fluid is recirculated to the liquid manifold. A pump (not shown) may be used to move the dielectric fluid through a cooling loop.

Figure 4B:
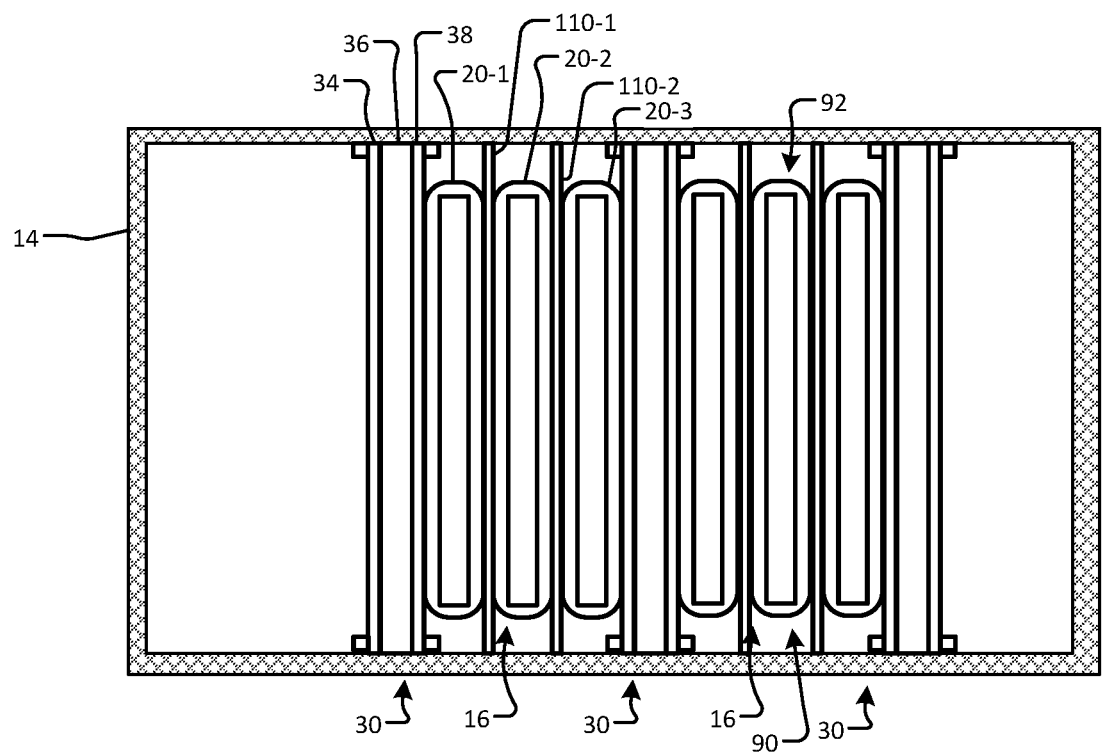
FIG. 4B is a side cross-sectional view of another example of an immersion cooling system with dividers and separating plates between battery cells according to the present disclosure.

Referring now to FIG. 4B, in addition to the dividers 30, metal plates 110-1 and 110-2 (collectively metal plates 110) can be used between the C battery cells 20 in a battery cell group. The metal plates 110 are used to further isolate the vent gases to a given battery cell to prevent further propagation. In this example, the metal plates 110 have an area similar to side surfaces of the battery cells and extend from at or near one side surface of the battery enclosure to at or near an opposite side surface. In some examples, C-1 metal plates are used between C of the battery cells and the dividers 30 are arranged adjacent to outer surfaces of the battery cell 20-1 and the battery cell 20-C. In the example shown in FIG. 4B, the G battery cell groups 16 includes 3 of the C battery cells 20 and 2 of the metal plates 110 between the C battery cells 20 in each of the G battery cell groups 16, although additional battery cells 20 and metal plates 110 can be used.

Figure 4C:
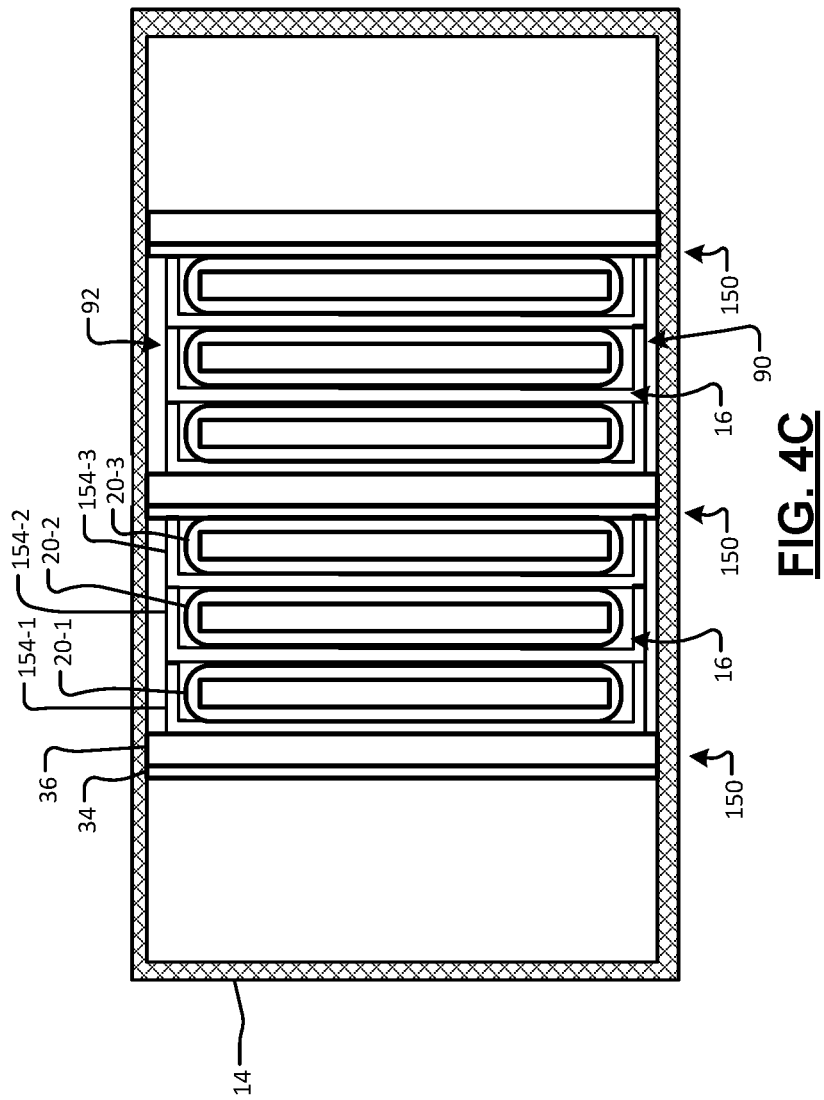
FIG. 4C is a side cross-sectional view of another example of an immersion cooling system with dividers and separating plates between battery cells according to the present disclosure.

Referring now to FIG. 4C, in addition to the dividers 30, metal plates 154-1, 154-2 and 154-3 (collectively metal plates 154) can be used to surround the C battery cells 20 in each of the G battery cell groups 16. In this example, the metal plates 154 have a "C"-shaped cross section to fully enclose the C battery cells 20. In some examples, C metal plates are used for C of the battery cells and the dividers are arranged adjacent to outer surfaces of the battery cell 20-1 and the battery cell 20-C. The metal plates 154 direct vent gases longitudinally to ends of the battery enclosure 14. In the example in FIG. 4C, the G battery cell groups 16 include 3 of the battery cells and 3 of the metal plates 154, although additional battery cells 20 and metal plates 154 can be used.

Figure 5:
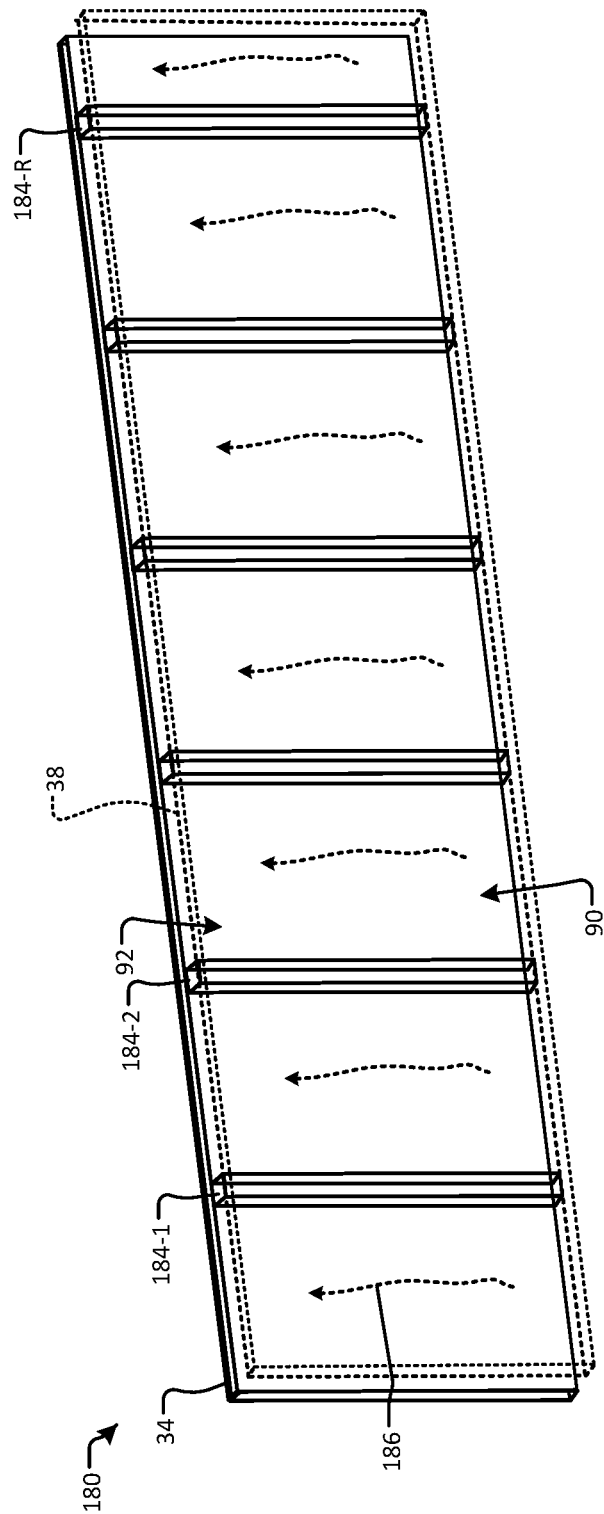
FIG. 5 is a perspective view of another example of a divider including metal plates, insulating spacer members and dielectric fluid flowing between the metal plates according to the present disclosure.
Figure 6A:
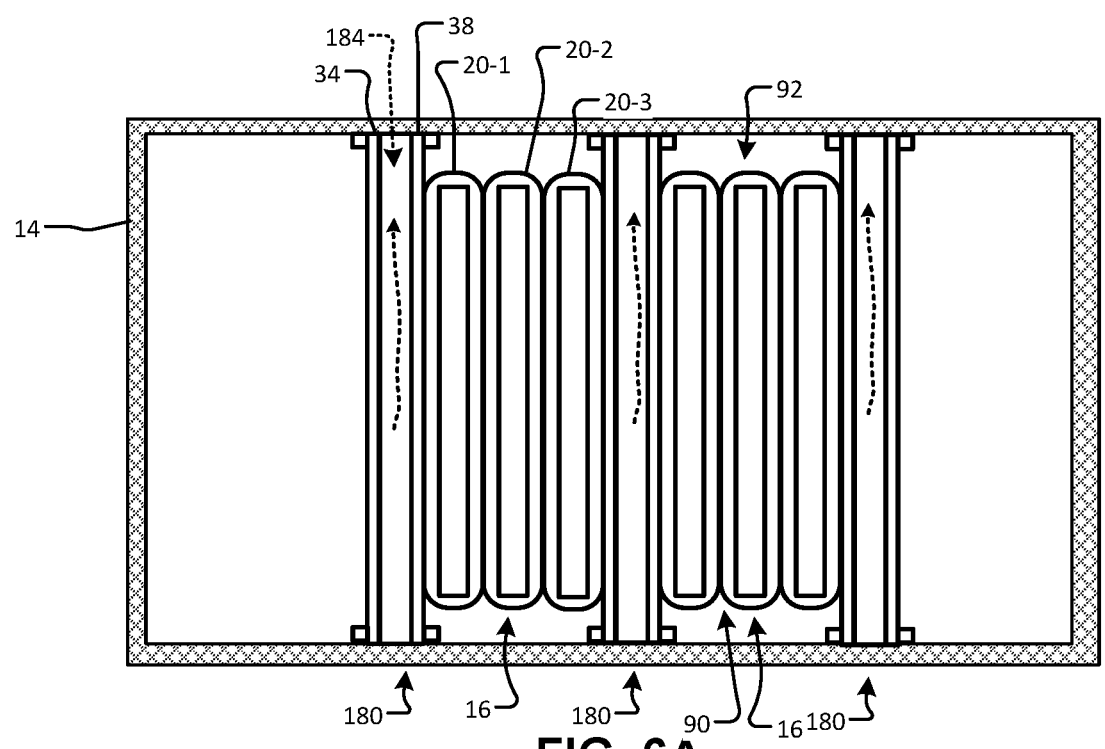
FIG. 6A is a side cross-sectional view of an immersion cooling system with a divider including metal plates and dielectric fluid flowing between the metal plates.

Referring now to FIGS. 5 and 6A, both edge cooling and face cooling can be performed. A divider 180 includes metal plates 34 and 38 arranged on opposite sides of insulating spacer members 184-1, 184, . . . , and 184-R (collectively and individually insulating spacer members 184) that extend vertically and are horizontally spaced apart. Dielectric fluid flows between the metal plates as shown by dotted lines 186 to provide face cooling of the G battery cell groups 16. The insulating spacer members 184 maintain spacing of the metal plates 34 and 38 and provide a cavity in which the dielectric fluid can exchange heat with faces of the battery cells.

Figure 2:
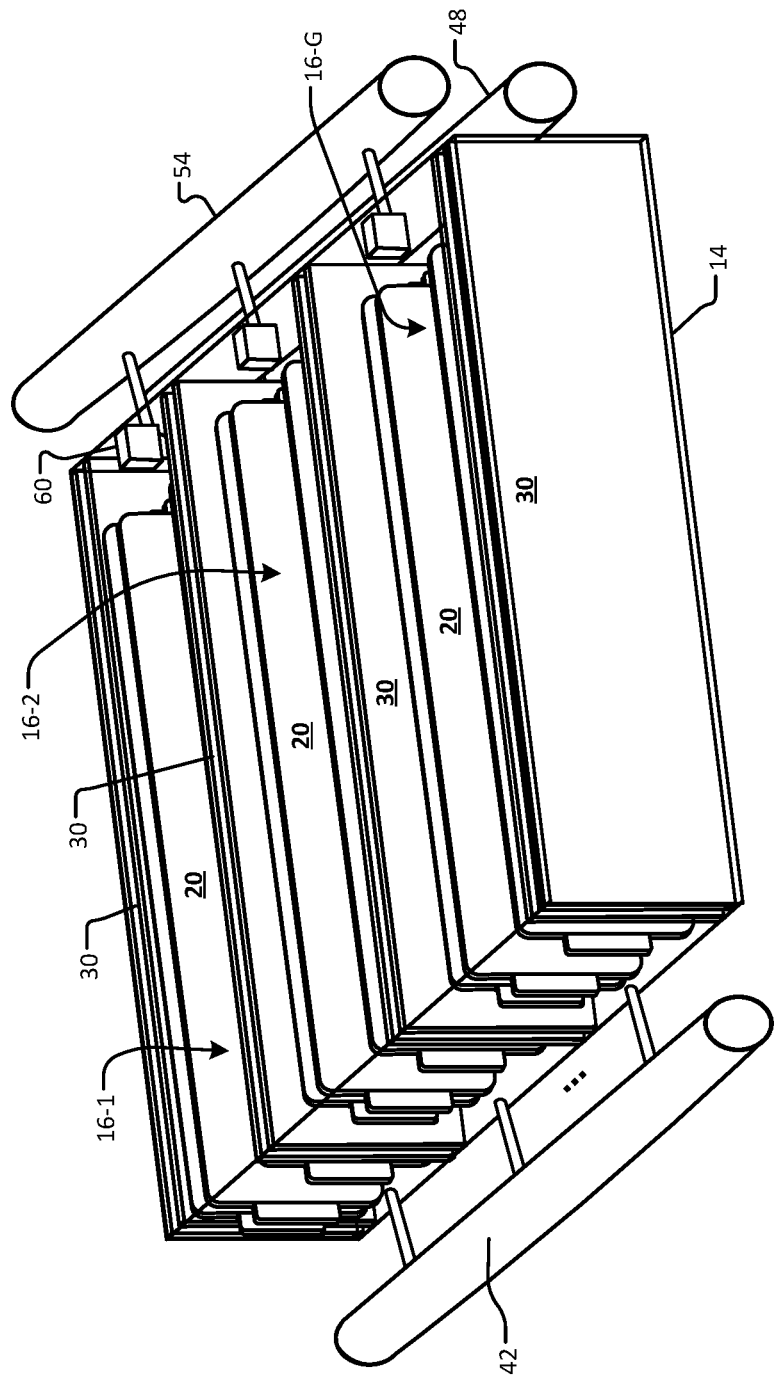
FIG. 2 is a perspective view of an example of an immersion cooling system according to the present disclosure.
Figure 6B:
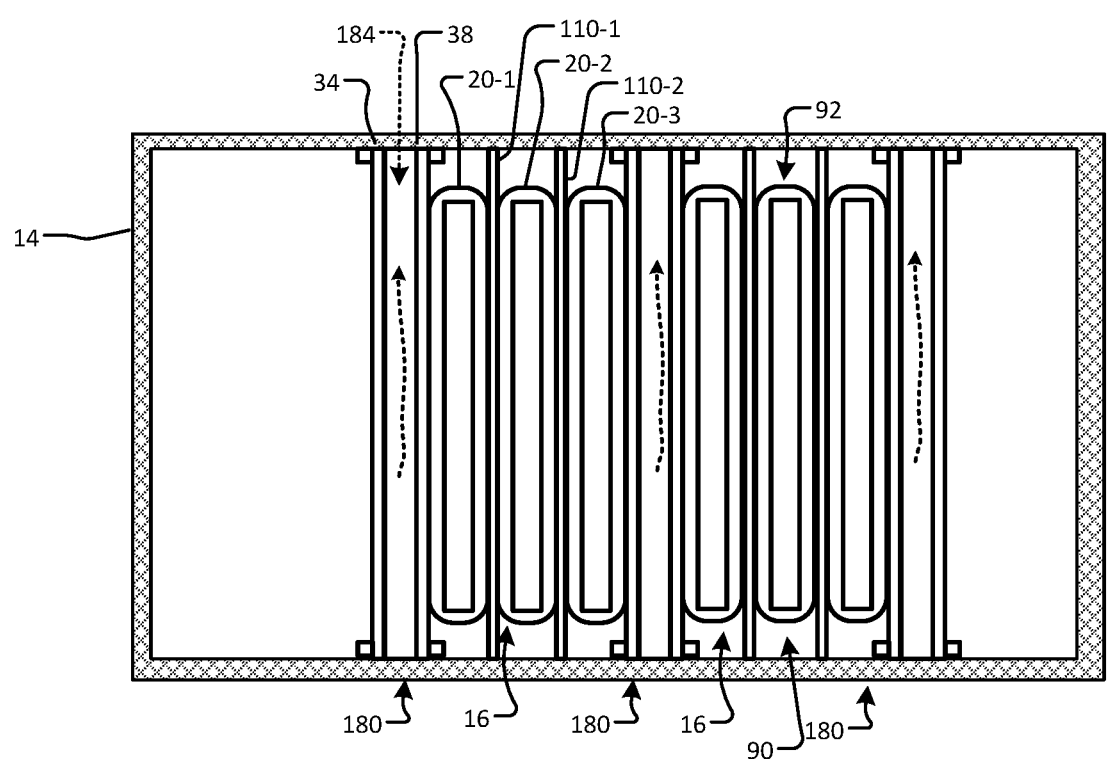
FIG. 6B is a side cross-sectional view of an immersion cooling system with divider including metal plates, dielectric fluid flowing between the metal plates and metal plates between battery cells.

Referring now to FIG. 6B, in addition to the dividers 180, metal plates 110-1 and 110-2 (collectively metal plates 110) can be used between the C battery cells 20 in a battery cell group. In this example, the metal plates 110 have a side surface area similar to a side surface area of the battery cells. In some examples, C-1 metal plates are used between C of the battery cells and the dividers 30 are arranged adjacent to outer surfaces of the battery cell 20-1 and the battery cell 20-C. As can be appreciated, 3 of the battery cells are shown in FIG. 4 and 2 of the metal plates are used, although additional battery cells 20 and metal plates 110 can be used.

While not shown, both edge cooling and face cooling can be used with the "C"-shaped metal plates of FIG. 4B.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An immersion cooling system for a battery system, comprising:
    a battery enclosure;
    G battery cell groups arranged in the battery enclosure, wherein each of the G battery cell groups include C battery cells, where G and C are integers greater than one;
    a plurality of dividers each arranged between an adjacent pair of the G battery cell groups, wherein each of the plurality of dividers includes a first metal plate extending along a side surface of one of the C battery cells of one of the adjacent pair of the G battery cell groups, a second metal plate extending along a side surface of one of the C battery cells of the other one of the adjacent pair of the G battery cell groups, and at least one insulating member disposed between the first metal plate and the second metal plate, and wherein the second metal plate of each of the plurality of dividers has a "C"-shaped cross-section;

a gas manifold configured to receive vent gases from each of the G battery cell groups;

a first liquid manifold configured to supply a recirculated dielectric fluid to the battery enclosure to immerse the C battery cells of the G battery cell groups; and a second liquid manifold configured to receive the recirculated dielectric fluid from the battery enclosure.

2. The immersion cooling system of claim 1, wherein the at least one insulating member of each of the plurality of dividers includes a plurality of vertical insulating spacer members that are spaced horizontally apart.

3. The immersion cooling system of claim 1, further comprising a plurality of metal plates arranged between the C battery cells of each of the G battery cell groups.

4. The immersion cooling system of claim 1, wherein each of the C battery cells in each of the G battery cell groups is a pouch-type battery cell.

5. The immersion cooling system of claim 1, further comprising G pressure relief valves in fluid communication with the G battery cell groups, respectively, and the gas manifold.

6. A method for cooling a battery system, comprising:
arranging C battery cells in G battery cell groups, where G and C are integers greater than one;
arranging the G battery cell groups in a battery enclosure;
arranging a divider of a plurality of dividers between an adjacent pair of the G battery cell groups, wherein each of the plurality of dividers includes a first metal plate extending along a side surface of one of the C battery cells of one of the adjacent pair of the G battery cell groups, a second metal plate extending along a side surface of one of the C battery cells of the other one of the adjacent pair of the G battery cell groups, and at least one insulating member disposed between the first metal plate and the second metal plate, and wherein the second metal plate of each of the plurality of dividers has a "C"-shaped cross-section;
removing, via a gas manifold, vent gases from the battery enclosure using a gas manifold in communication with each of the G battery cell groups;
supplying, via a first liquid manifold, a recirculated dielectric fluid to the battery enclosure to immerse the C battery cells of the G battery cell groups; and
removing, via a second liquid manifold, the recirculated dielectric fluid from the battery enclosure.

7. The method of claim 6, wherein the at least one insulating member of each of the plurality of dividers includes a plurality of vertical insulating spacer members that are spaced horizontally apart.

8. The method of claim 6, further comprising arranging a plurality of metal plates between the C battery cells of each of the G battery cell groups.

9. The method of claim 6, wherein each of the C battery cells in each of the G battery cell groups is a pouch-type battery cell.

10. The method of claim 6, further comprising arranging G pressure relief valves in fluid communication with the G battery cell groups, respectively, and the gas manifold.

11. The immersion cooling system of claim 1, wherein the first liquid manifold is configured to supply the recirculated dielectric fluid to fill the battery enclosure to a level above upper edges of the C battery cells.

12. The method of claim 6, wherein supplying the recirculated dielectric fluid to the battery enclosure to immerse the C battery cells of the G battery cell groups includes supplying the recirculated dielectric fluid to fill the battery enclosure to a level above upper edges of the C battery cells.

13. The method of claim 10, wherein the G pressure relief valves are configured to be in a closed position during normal operation, an open position when pressure build up exceeds a first threshold, and a popped position when the pressure build up exceeds a second threshold.

14. The method of claim 8, wherein the plurality of metal plates arranged between the C battery cells of each of the G battery cell groups have a "C"-shaped cross-section.

15. The method of claim 6, wherein the at least one insulating member of each of the plurality of dividers defines a cavity for the dielectric fluid to flow between the first metal plate and the second metal plate of each of the plurality of dividers.

16. The immersion cooling system of claim 5, wherein the G pressure relief valves are configured to be in a closed position during normal operation, an open position when pressure build up exceeds a first threshold, and a popped position when the pressure build up exceeds a second threshold.

17. The immersion cooling system of claim 3, wherein the plurality of metal plates arranged between the C battery cells of each of the G battery cell groups have a "C"-shaped cross-section.

18. The immersion cooling system of claim 1, wherein the at least one insulating member of each of the plurality of dividers defines a cavity for the dielectric fluid to flow between the first metal plate and the second metal plate of each of the plurality of dividers.

19. The immersion cooling system of claim 1, wherein:
the immersion cooling system further comprises G pressure relief valves in fluid communication with the G battery cell groups, respectively, and the gas manifold; and
the at least one insulating member of each of the plurality of dividers includes a plurality of vertical insulating spacer members that are spaced horizontally apart.

20. The immersion cooling system of claim 1, wherein:
the immersion cooling system further comprises G pressure relief valves in fluid communication with the G battery cell groups, respectively, and the gas manifold; and
the at least one insulating member of each of the plurality of dividers defines a cavity for the dielectric fluid to flow between the first metal plate and the second metal plate of each of the plurality of dividers.

* * * * *